(12) United States Patent
Ma et al.

(10) Patent No.: US 11,874,704 B2
(45) Date of Patent: Jan. 16, 2024

(54) LID DISPLAY AREAS

(71) Applicant: HEWLETT-PACKARD DEVELOPMENT COMPANY, L.P., Spring, TX (US)

(72) Inventors: Xiang Ma, Spring, TX (US); Derek Kyle Joseph Kanas, Spring, TX (US); Chan woo Park, Spring, TX (US); Guoxing Yang, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/677,374

(22) Filed: Feb. 22, 2022

(65) Prior Publication Data
US 2023/0266797 A1 Aug. 24, 2023

(51) Int. Cl.
*G06F 1/16* (2006.01)

(52) U.S. Cl.
CPC .......... *G06F 1/1652* (2013.01); *G06F 1/1624* (2013.01)

(58) Field of Classification Search
CPC .... G06F 1/1652; G06F 1/1624; G06F 3/1423; G09F 9/301
See application file for complete search history.

(56) References Cited

U.S. PATENT DOCUMENTS

| | | | |
|---|---|---|---|
| 7,786,951 B2 | 8/2010 | Huitema et al. | |
| 8,934,229 B2 | 1/2015 | Thorson | |
| 9,179,559 B1 | 11/2015 | Kim | |
| 10,403,236 B2 * | 9/2019 | Ent | G06F 3/0481 |
| 10,990,125 B1 * | 4/2021 | Tsai | G06F 1/1681 |
| 11,262,794 B2 * | 3/2022 | Wen | G06F 3/0202 |
| 11,416,024 B2 * | 8/2022 | Bryant | G06F 1/1632 |
| 11,543,858 B2 * | 1/2023 | Chen | G06F 1/1624 |
| 11,556,151 B2 * | 1/2023 | Rose | G06F 1/1662 |
| 11,573,611 B2 * | 2/2023 | Channaiah | G06F 1/1681 |
| 11,627,675 B2 * | 4/2023 | Eisenberg | H05K 5/0217 361/807 |
| 2004/0196209 A1 | 10/2004 | Chen et al. | |
| 2011/0050543 A1 * | 3/2011 | Chien | G06F 1/1692 345/1.3 |
| 2015/0153777 A1 | 6/2015 | Liu et al. | |
| 2018/0108330 A1 * | 4/2018 | Wallace | G06F 1/1652 |
| 2019/0018454 A1 * | 1/2019 | Jung | G06F 1/1641 |
| 2019/0196548 A1 | 6/2019 | Kim et al. | |
| 2019/0346954 A1 | 11/2019 | Jung et al. | |
| 2020/0253069 A1 * | 8/2020 | Cha | G06F 1/1681 |
| 2020/0409645 A1 * | 12/2020 | Clark | G06F 1/3265 |
| 2021/0173438 A1 * | 6/2021 | Lee | G06F 1/1616 |
| 2022/0147098 A1 * | 5/2022 | Stewart | G06F 1/1677 |

FOREIGN PATENT DOCUMENTS

WO WO-2018186631 A1 * 10/2018 ........... G06F 1/1641

* cited by examiner

*Primary Examiner* — Rockshana D Chowdhury
(74) *Attorney, Agent, or Firm* — Knobbe, Martens, Olson & Bear, LLP

(57) ABSTRACT

In some examples, an electronic device includes a lid section including a first display area disposed on an interior side and a second display area disposed on an exterior side opposite to the interior side, where the interior side is disposed on a top side of a base section when the lid section is closed, and a display panel disposed within the lid section, the display panel including a first portion and a second portion, the first portion visible via the first display area and the second portion visible via the second display area.

16 Claims, 8 Drawing Sheets

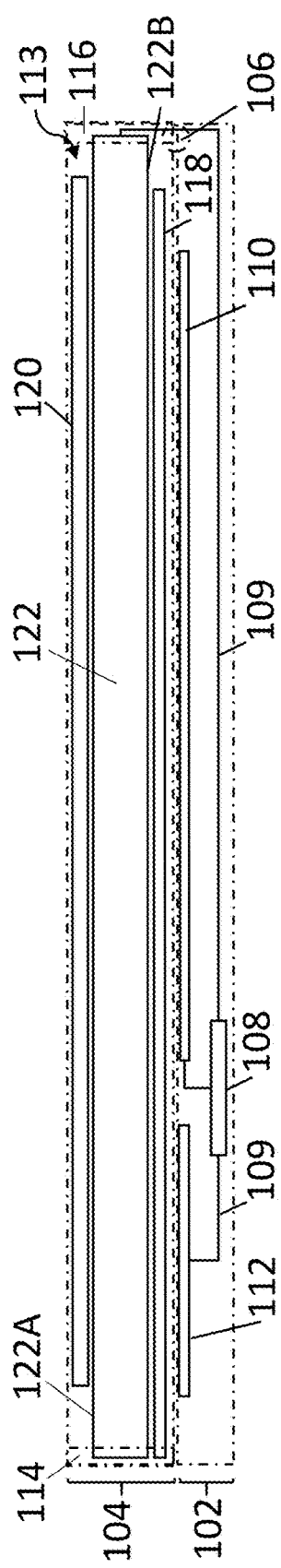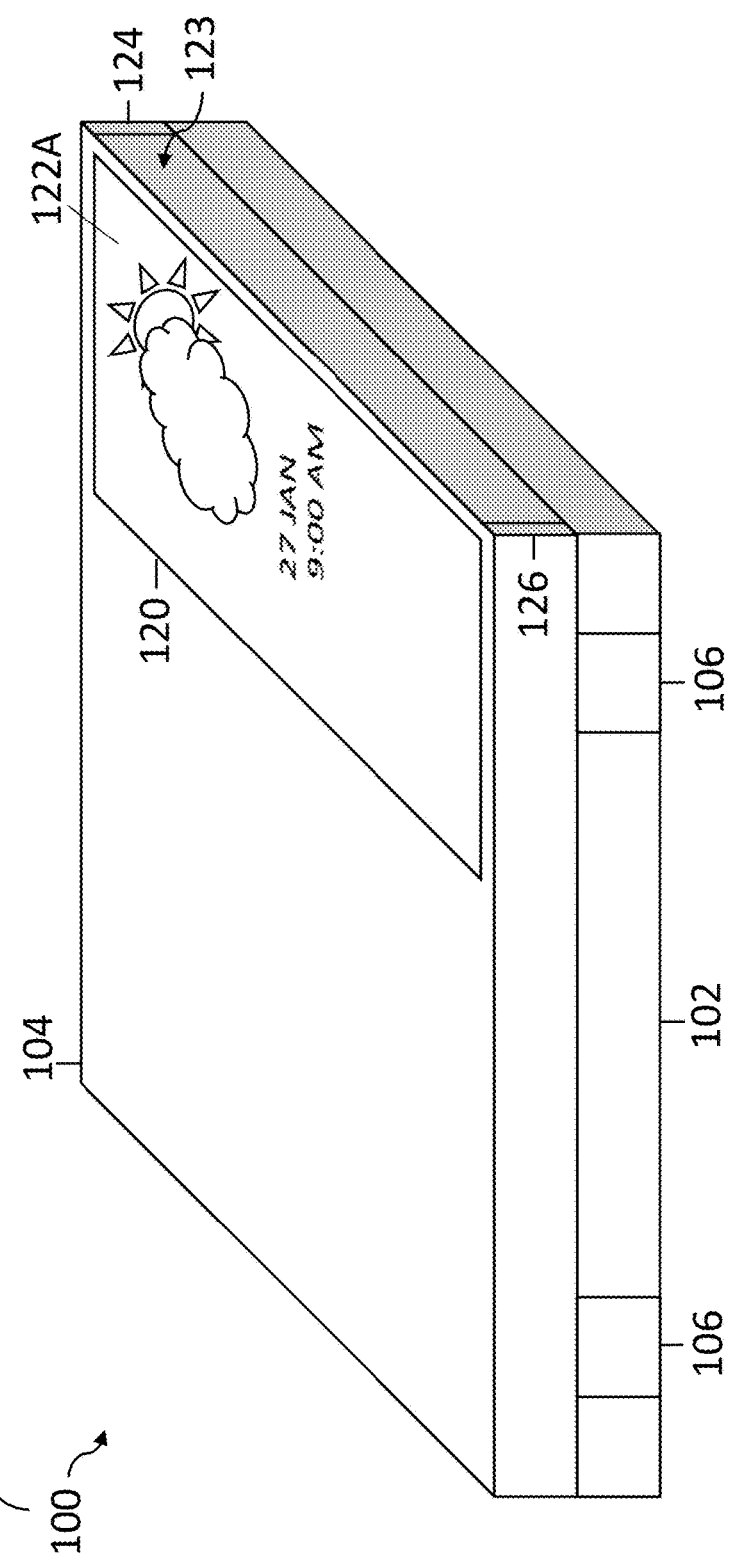
FIG. 1A
FIG. 1B

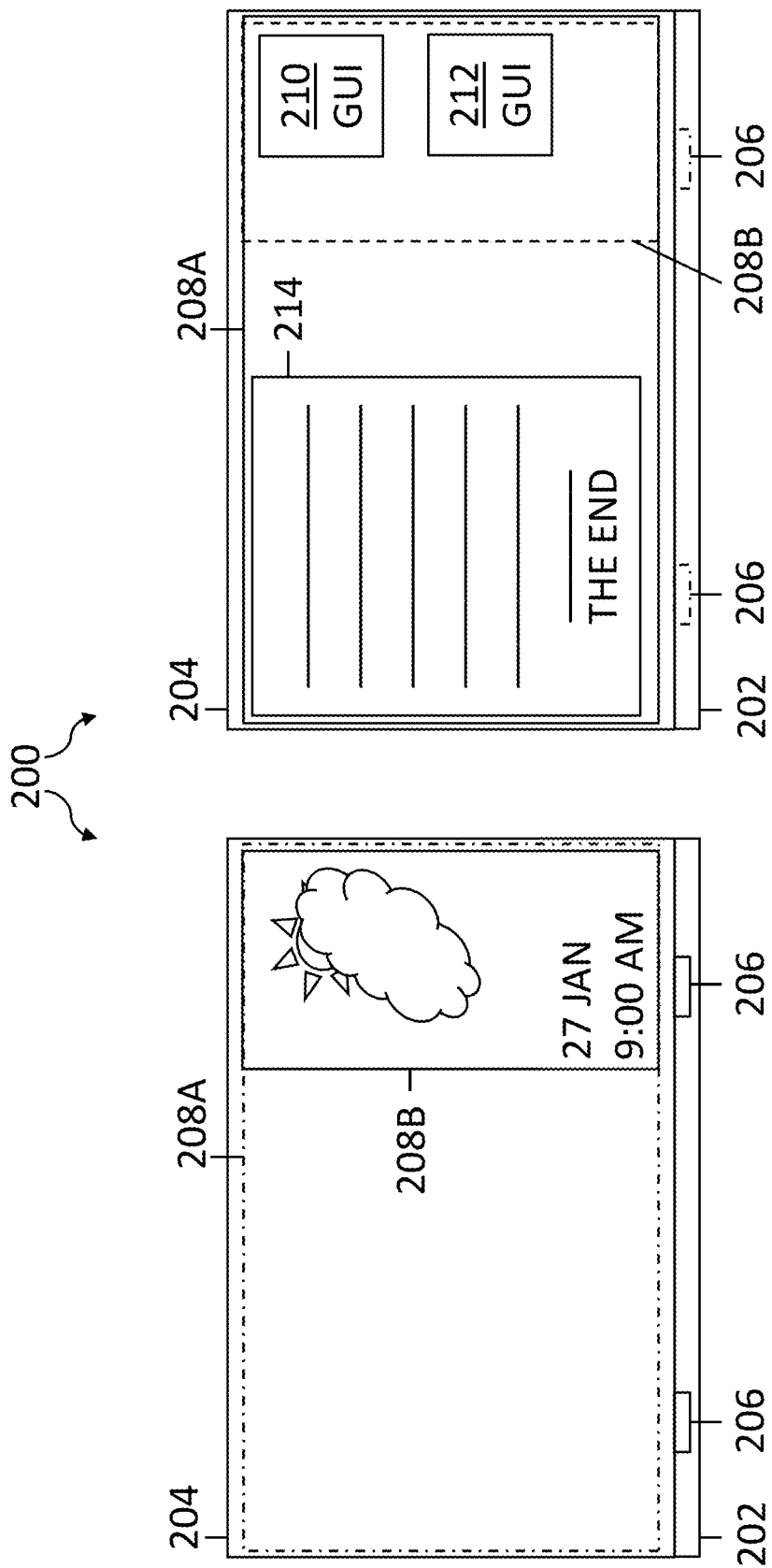

LID DISPLAY AREAS

BACKGROUND

Electronic devices such as desktops, laptops, notebooks, tablets, and smartphones include display devices. A display device includes a display panel that presents data for a user to view. The data is data of an application, a graphical user interface (GUI) of the application, or a combination thereof.

BRIEF DESCRIPTION OF THE DRAWINGS

Various examples are described below referring to the following figures.

FIGS. 1A and 1B are block diagrams depicting an electronic device having lid display areas, in accordance with various examples.

FIGS. 2A and 2B are block diagrams depicting an electronic device having lid display areas, in accordance with various examples.

DETAILED DESCRIPTION

Figure 3:
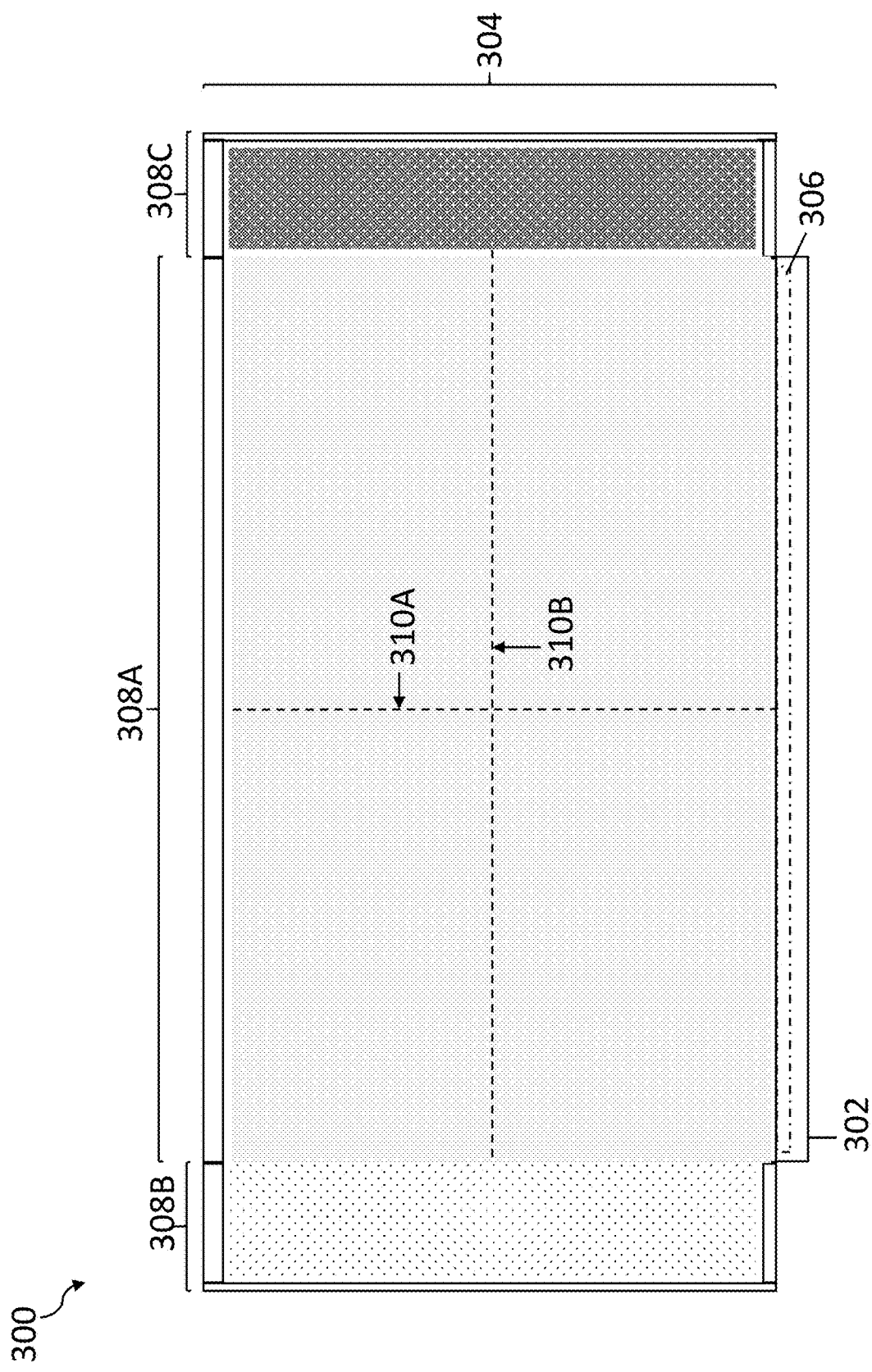
FIG. 3 is a block diagram depicting an electronic device having lid display areas, in accordance with various examples.

As described above, electronic devices include display devices having display panels that present data for users to view. As electronic device technology advances, a desire for enhanced user experience generates a conflict between a desire for reduced dimensions of the electronic device that is portable and increased dimensions of a display area of the portable electronic device.

To increase the display area, some electronic devices include an additional display device. The additional display device is separate from the display device of the electronic device. The additional display device increases the display area but also increases overall dimensions of the electronic device. In some instances, additional hardware components connect the additional display device to the electronic device. The additional hardware components increase the overall dimensions of the electronic device. In other instances, the additional display device is integrated with the electronic device and includes an additional display area that is retractable. However, the retractable portion is not viewable when retracted. In various instances, the additional display device is located on a portion of the electronic device that includes input/output (I/O) devices (e.g., a keyboard, a touchpad). The additional display device that is co-located with the I/O devices reduces the dimensions of the I/O devices, thereby reducing the user experience. The additional display device that is co-located with the I/O devices is not viewable when a lid of the electronic device is closed.

This description describes an electronic device that includes a lid section having an extendable display area and multiple fixed display areas and a display panel having multiple portions. The lid section includes a fixed display area disposed on an interior side of the lid section. The interior side is disposed on a top side of a base section of the electronic device when the lid section is closed. The fixed display area disposed on the interior side is herein referred to as an interior fixed display area. A first portion of the multiple portions of the display panel is viewable via the interior fixed display area. The lid section includes another fixed display area disposed on an exterior side of the lid section that is opposite the interior side of the lid section. The fixed display area disposed on the exterior side is herein referred to as an exterior fixed display area. The extendable display area is coupled to an extendable portion of a frame of the lid section. The frame is herein referred to as an extendable frame in various examples. In some examples, another extendable display area is coupled to another extendable portion of the frame.

When the lid section is opened, the extendable portion of the frame is extendable outward from a central axis of the lid section, and a second portion of the multiple portions of the display panel is viewable via the extendable display area. When the lid section is closed, the extendable portion of the frame is retracted into the lid section, and the second portion of the multiple portions of the display panel is viewable via the exterior fixed display area. In some examples, when the lid section is opened, the extendable portion of the display panel is retracted into the lid section, and the second portion of the multiple portions of the display panel is viewable via the exterior fixed display area.

In various examples, a setting of the first portion of the multiple portions of the display panel is different from a setting of the second portion of the multiple portions of the display panel. The setting includes whether pixels are enabled/disabled, an intensity of the pixels, a contrast of the pixels, a color format of the pixels, a sharpness of the pixels, a language, a transparency, a rotation, a dimension, an aspect ratio, a position relative to the central axis, or a combination thereof. In some examples, the electronic device includes an input device that enables a user to interact with the exterior fixed display area. The input device is a touch panel, a sensor, a mechanical button, or a combination thereof.

Utilizing the lid section that includes the extendable display area and the multiple fixed display areas increases dimensions of an overall display area of the electronic device. By including the exterior fixed display area and the interior fixed display area, data is viewable whether the lid section of the electronic device is opened or closed. By utilizing the exterior fixed display area and the input device, a user is able to interact with the electronic device via the exterior fixed display area without opening the lid section, thereby enhancing the user experience. The electronic device including the exterior fixed display area, the extendable display area, or the combination thereof, having different settings enables the user to utilize the various display areas for different purposes. The electronic device including the exterior fixed display area and the interior fixed display area enables a first user of the electronic device to utilize the electronic device simultaneously with a second user of the electronic device.

In some examples in accordance with the present description, an electronic device is provided. The electronic device includes a lid section including a first display area disposed on an interior side and a second display area disposed on an exterior side opposite to the interior side, where the interior side is disposed on a top side of a base section when the lid section is closed, and a display panel disposed within the lid section, the display panel including a first portion and a second portion, the first portion visible via the first display area and the second portion visible via the second display area.

In other examples in accordance with the present description, an electronic device is provided. The electronic device includes a lid section including a first display area and a second display area, and a display panel disposed within the lid section, the display panel including a first portion viewable via the first display area according to a first setting and a second portion viewable via the second display area according to a second setting, where the first setting is different from the second setting.

In yet other examples in accordance with the present description, an electronic device is provided. The electronic device includes a lid section including a first display area disposed on an interior side, a second display area disposed on an exterior side opposite to the interior side, and an extendable portion of a frame. The electronic device includes a display panel disposed within the lid section. The display panel includes a first portion coupled to the extendable portion of the frame and a second portion viewable via the first display area. In response to the extendable portion of the frame having a first orientation, the first portion is viewable via an extendable display area coupled to the extendable portion of the frame. In response to the extendable portion of the frame having a second orientation, the first portion is viewable via the second display area.

Referring now to FIGS. 1A and 1B, block diagrams showing different views of an electronic device 100 having lid display areas are shown, in accordance with various examples. The electronic device 100 is a desktop, a laptop, a notebook, a tablet, a smartphone, or other portable computing device including lid display areas. The electronic device 100 includes a base section 102, a lid section 104, and a hinge section 106. The base section 102 is coupled to the lid section 104 via the hinge section 106, for example. The base section 102 is coupled to the hinge section 106, and the hinge section 106 is coupled to the lid section 104, for example.

Referring now to FIG. 1A, a block diagram of a cross-section view of the electronic device 100 having lid display areas is shown. The dotted lines indicate the base section 102 and the lid section 104 while the solid lines indicate components disposed within the base section 102 and the lid section 104. The base section 102 includes a controller 108 and I/O devices 110, 112. The controller is a central processing unit (CPU), a graphics processing unit (GPU), a system on a chip (SoC), an image signal processor (ISP), or a field programmable gate array (FPGA), for example. An I/O device 110 is a keyboard, for example. An I/O device 112 is a touchpad, for example.

The lid section 104 includes an extendable portion 113 of a frame, display areas 118, 120, and a display panel 122. In various examples, the display areas 118, 120 are referred to as lid display areas. The frame is metal, plastic, composite material, or other suitable material for providing structural support to the lid section 104. The lid display areas are portions of the frame that include a material through which the display panel 122 is viewable. The material of the lid display areas is glass, plastic, or other suitable transparent or semi-transparent material. An extendable portion 113 of the frame has edges 114, 116. The frame is metal, plastic, composite material, or other suitable material for providing structural support to the lid section 104. The display panel 122 is a liquid crystal display (LCD) panel, a light-emitting diode (LED) panel, a quantum dot (QD) panel, an organic LED (OLED) panel, a microLED panel, a plasma panel, or any suitable panel for displaying data of the electronic device 100. The display panel is a rollable display panel, for example. Rollable, as used herein, refers to a display panel that is flexible, or deformable, within a given parameter or specification (e.g., a minimum radius of curvature) without losing electrical function or connectivity. The display panel is a rollable OLED panel, for example. The display panel includes portions 122A, 122B. A portion 122A is an extendable, or rollable, portion of the display panel 122, and a portion 122B is a fixed portion of the display panel 122, for example.

While not explicitly shown, in some examples, the electronic device 100 includes network interfaces, antennas, radios, video adapters, sound cards, local buses, power sources, storage devices, other I/O devices (e.g., a mouse, a speaker, a microphone, an image sensor), or a combination thereof. The controller 108 couples to the I/O device 110, the I/O device 112, and the display panel 122 via bus 109.

In various examples, the controller 108 of the electronic device 100 executes executable code of the electronic device 100. When executed by the controller 108, the executable code drives electronic circuitry (not explicitly shown) of the display panel 122, controls a motor of an extending mechanism for the extendable portion 113 of the frame, or a combination thereof, for example. In other examples, the display panel 122 is a printed display with information printed thereon. The rollable display panel may roll and unroll at one end, as described below with respect to FIG. 5, at opposing ends, as described below with respect to FIG. 3, or at connected ends.

In various examples, the electronic device 100, the lid section 104, or a combination thereof, is referred to as having a closed position. The display area 118 is disposed on a top side, or an interior side, of the base section 102 when the lid section 104 is in the closed position. The display area 118 is an interior fixed display area, and the display area 120 is an exterior fixed display area, for example. When the electronic device 100 is in an opened position, the top side of the base section 102 enables access to the I/O device 110, 112 and the portion 122*b* of the display panel 122 is viewable via the display area 118. In some examples, the lid section 104 is referred to as having the opened position when the electronic device 100 is in the opened position.

While in some examples a user extends the extendable portion 113 of the frame by grasping the edges 114, 116, in other examples, other methods of extending the extendable portion 113 are utilized. For example, an input device enables the user to cause the extension of the extendable portion 113. The input device is a physical device, executable code, or a combination thereof. For example, by engaging a button, a knob, or other physical device, as described below with respect to FIG. 7 or 8, the user causes the extendable portion 113 to open by a specified amount. In some examples, the user engages the button, the knob, or the other physical device to select a setting. In another example, a graphical user interface (GUI) enables the user to select a setting that causes the extendable portion 113 to open by the specified amount. The setting is an aspect ratio setting, for example. In response to a setting selection, the controller 108 causes the extendable portion 113 of the frame to extend outward from the central axis of the lid section 104 by the specified amount. For example, in response to the user selecting an aspect ratio of 4:3, the controller 108 causes the extendable portion 113 of the frame to extend outward from the central axis of the lid section 104 so that the display area 118 combined with the extendable display area (not expressly shown) has the 4:3 aspect ratio.

Referring now to FIG. 1B, a block diagram showing a top-down perspective view of the electronic device 100 having lid display areas is shown. The lid section 104 includes an extendable portion 123 of the frame having edges 124, 126. The extendable portion 123 of the frame is disposed on a side opposite to the extendable portion 113 of the frame, for example. When the extendable portion 123 is retracted into the lid section 104, regardless of the position of the electronic device 100, the portion 122A of the display panel 122 is viewable via the display area 120. For example, the portion 122A of the display panel displays a notification. The notification includes a system notification (e.g., update available), an application notification (e.g., a message received), or a combination thereof. For example, the portion 122A of the display panel 122 displays a notification that indicates a weather condition, a date, and a time. In another example, the portion 122A of the display panel 122 displays a static image. The static image is a decorative image, for example.

In some examples, a dimension (e.g., a height, a width) of the display area 118 is equivalent to the dimension of the display area 120. Utilizing the dimension for the display area 118 that is equivalent to the dimension of the display area 120 enables viewing of an entire dimension of the display panel 122. For example, given the display panel 122 having a height that is 11 inches (in), the display area 118 and the display area 120 have heights that are 11 in. In other examples, the dimension of the display area 118 is different than the dimension of the display area 120. For example, the height of the display area 120 is 11.5 in. and the height of the display area 118 is 12 in. Utilizing a different dimension for the display area 120 that is less than the dimension of the display area 118 accommodates other components, such as antennas, within the lid section 104.

By utilizing the display area 120 to display notifications, the electronic device 100 reduces power consumption because the user receives the notifications without opening the lid section 104. Opening the lid section 104 powers up multiple components of the electronic device 100, for example. By utilizing the display area 120 to display notifications without opening the lid section 104, the electronic device 100 reduces power consumption by blocking power up of the multiple components of the electronic device 100.

Referring now to FIGS. 1A and 1B, in some examples, as described above, the electronic device 100 includes the lid section 104 including a first display area, the display area 118, disposed on an interior side and a second display area, the display area 120, disposed on an exterior side opposite to the interior side, where the interior side is disposed on a top side of the base section 102 when the lid section 104 is closed, and the display panel 122 disposed within the lid section 104, the display panel 122 including a first portion, the portion 122B, and a second portion, the portion 122A, the portion 122B visible via the display area 118 and the portion 122A visible via the display area 120. In various examples, the display area 118 is on a first side (e.g., the interior side) of the lid section 104 and the display area 120 is on a second side (e.g., the exterior side) of the lid section 104. The first side is opposite the second side. By including the display areas 118, 120, data is viewable whether the lid section 104 of the electronic device 100 is opened or closed, as shown below with respect to FIGS. 2A and 2B.

In various examples, the lid section 104 includes a third display area disposed on an extendable portion 113 of the frame of the electronic device 100. In response to an extension of the extendable portion 113 of the frame, the portion 122A is visible via the third display area. In some examples, the portion 122B is visible via the display area 118 according to a first setting and the portion 122A is visible via the display area 120 according to a second setting. The first setting is different than the second setting. In other examples, in response to the extension of the extendable portion 113 of the frame, the portion 122A is visible via the third display area according to a third setting. The third setting is different than the first setting and the second setting.

Referring now to FIGS. 2A and 2B, block diagrams showing different views of an electronic device 200 having lid display areas are shown, in accordance with various examples. The electronic device 200 is the electronic device 100, for example. The electronic device 200 includes a base section 202, a lid section 204, and a hinge section 206. The base section 202 is the base section 102, for example. The lid section 204 is the lid section 104, for example. The hinge section 206 is the hinge section 106, for example. The lid section 204 includes display areas 208A, 208B. In various examples, the display areas 208A, 208B are referred to as lid display areas. A display area 208A is the display area 118, for example. A display area 208B is the display area 120, for example. In some examples, the base section 202 is coupled to the lid section 204 via the hinge section 206.

Referring now to FIG. 2A, a block diagram of a cross-section view of a backside of the electronic device 200 having lid display areas is shown. The dotted lines indicate that the display area 208A is disposed on an opposite side of the electronic device 200. The lid section 204 is in the opened position. A portion (e.g., the portion 122A) of a display panel (e.g., the display panel 122) is viewable via a display area 208B. The display area 208B is an exterior fixed display area. The display area 208B displays a weather condition, a date, and a time, for example.

Referring now to FIG. 2B, a block diagram of a cross-section view of a frontside of the electronic device 200 having lid display areas is shown. The dotted lines indicate that the display area 208B and the hinge section 206 is disposed on an opposite side of the electronic device 200. The lid section 204 is in the opened position. Another portion (e.g., the portion 122B) of the display panel is viewable via a display area 208A. The display area 208A is an interior fixed display area. The display area 208A displays GUIs 210, 212, 214, for example. A GUI 210 is for a first executable code, a GUI 212 is for a second executable code, and a GUI 214 is for a third executable code, for example. The GUI 214 is for a word processing application, for example.

Executable code, as used herein, includes "applications," "software," and "firmware." "Applications," "software," and "firmware" are considered to be interchangeable in the context of the examples provided. "Firmware" is considered to be machine-readable instructions that a controller (e.g., the controller 108) executes prior to execution of an operating system (OS), with a small portion that continues after the OS bootloader executes (e.g., a callback procedure), for example. "Applications" and "software" are considered broader terms than "firmware," and are considered to refer to machine-readable instructions that execute after the OS bootloader starts, through OS runtime, and until the electronic device (e.g., a peripheral device) shuts down, for example.

In various examples, dimensions of the display area 208A are determined by dimensions of the interior side of the lid section 204 when the extendable display area is retracted into the lid section 204, as shown in FIGS. 2A and 2B. A dimension of the display area 208A is described via a diagonal length between opposite corners of the interior side of the lid section 204 when the extendable display area is retracted into the lid section 204, for example. In another example, a first dimension of the display area 208A is a width in pixels of the display panel shown via the display area 208A when the extendable display area is retracted into the lid section 204, and a second dimension of the display area 208A is a height in pixels of the display panel shown via the display area 208A when the extendable display area is retracted into the lid section 204. The width is measured along a horizontal axis of the display area 208A that is parallel to the base section 202, and the height is measured along a vertical axis of the display area 208A that is perpendicular to the base section 202.

By including the display areas 208A, 208B, data is viewable whether the lid section 204 of the electronic device 200 is opened or closed. The electronic device 200 including the display area 208A, 208B enables a first user of the electronic device 200 to utilize the electronic device 200 simultaneously with a second user of the electronic device 200. For example, the first user uses the display area 208A while the second user uses the display area 208B.

Referring now to FIG. 3, a block diagram showing an electronic device 300 having lid display areas is shown, in accordance with various examples. The electronic device 300 is the electronic device 100, 200, for example. The electronic device 300 includes a base section 302, a lid section 304, and a hinge section 306. The base section 302 is the base section 102, 202, for example. The lid section 304 is the lid section 104, 204, for example. The hinge section 306 is the hinge section 106, 206, for example. The lid section 304 includes display areas 308A, 308B, 308C and has central axes 310A, 310B. In various examples, the display areas 308A, 308B, 308C are referred to as lid display areas. A display area 308A is the display area 118, 208A, for example. A display area 308B is an extendable display area. A display area 308C is another extendable display area. In some examples, a central axis 310A is referred to herein as a vertical central axis, and a central axis 310b is referred to herein as a horizontal central axis.

In various examples, the base section 302 is coupled to the lid section 304 via the hinge section 306. The display area 308B is coupled to a first extendable portion of a frame of the lid section 304. The first extendable portion of the frame is the extendable portion 123, for example. The display area 308C is coupled to a second extendable portion of the frame of the lid section 304. The second extendable portion of the frame is the extendable portion 113, for example. In some examples, the display areas 308A, 308B, 308C are disposed on a first side of the electronic device 300. The dotted lines indicate that the hinge section 306 is disposed on a second side that is an opposite side of the electronic device 300 to the first side.

In some examples, in response to an extension of an extendable portion of the frame, a transparent cover extends to protect the extendable display area. The transparent cover is a two dimensional plate or any other suitable shape for protecting the extendable display area. A material of the transparent cover is plastic, glass, or other suitable transparent material. For example, the transparent covers of the display areas 308B, 308C are rectangular in shape. In various examples, the transparent cover is coupled to the extendable portion of the frame. In some examples, the transparent cover is a touchscreen or other suitable input device that enables a user to interact with content on a display panel beneath the transparent cover.

As described above with respect to FIG. 1, dimensions of an interior fixed display area, the display area 308A, are determined by dimensions of the interior side of the lid section 304 when the display areas 308B, 308C are retracted into the lid section 304. Extending the display areas 308B, 308C increases the dimensions of the display area viewable on the interior side of the lid section 304 to include dimensions of the display areas 308B, 308C. In various examples, dimensions of the display areas 308B, 308C are adjustable by a controller (e.g., the controller 108) to correspond to an aspect ratio setting of a video displayed by the display panel. For example, the display areas 308B, 308C are extended by an amount that results in a total display area of the display area viewable on the interior side of the lid section 304 from a 4:3 aspect ratio to a 16:9 aspect ratio.

In various examples, the display areas 308A, 308B, 308C have different settings, as indicated by the different shadings. The display area 308A has a first setting indicated by the solid gray area. The display area 308B has a second setting indicated by the black-dotted white area. The display area 308C has a third setting indicated by the white-dotted gray area. As described above, the setting includes whether pixels are enabled/disabled, an intensity of the pixels, a contrast of the pixels, a color format of the pixels, a sharpness of the pixels, a language, a transparency, a rotation, a dimension, an aspect ratio, a position relative to the central axis, or a combination thereof. For example, the display area 308A has a first intensity, the display area 308B has a second intensity, and the display area 308C has a third intensity.

The electronic device 300 includes the lid section 304 including a first display area, the display area 308A, and a second display area, the display area 308B, and a display panel (e.g., the display panel 122) disposed within the lid section 304 in various examples. The display panel includes a first portion (e.g., the portion 122B) viewable via the first display area according to a first setting and a second portion (e.g., the portion 122A) viewable via the second display area according to a second setting, where the first setting is different from the second setting. For example, the display area 308A has a first contrast setting, and the display area 308B has a second contrast setting. In some examples, the second display area is on an extendable portion of a frame of the electronic device 300.

In other examples, the lid section 304 includes a third display area, the display area 308C, on an extendable portion of a frame of the electronic device. The display panel includes a third portion viewable via the third display area according to a third setting. For example, the display area has a third contrast setting.

Utilizing the lid section 304 that includes the display areas 308A, 308B, 308C increases dimensions of an overall, or total, display area of the electronic device 300. The electronic device 300 including the display areas 308A, 308B, 308C having different settings enables the user to utilize the display areas 308A, 308B, 308C for different purposes. For example, the display areas 308B, 308C have a first setting that indicates a high intensity while the display area 308A has a second setting that indicates a color format for videos. The high intensity setting of the display areas 308B, 308C enhances lighting conditions while the user uses an image sensor (not explicitly shown) during a videoconferencing application that is displayed via the display area 308A.

Figure 4:
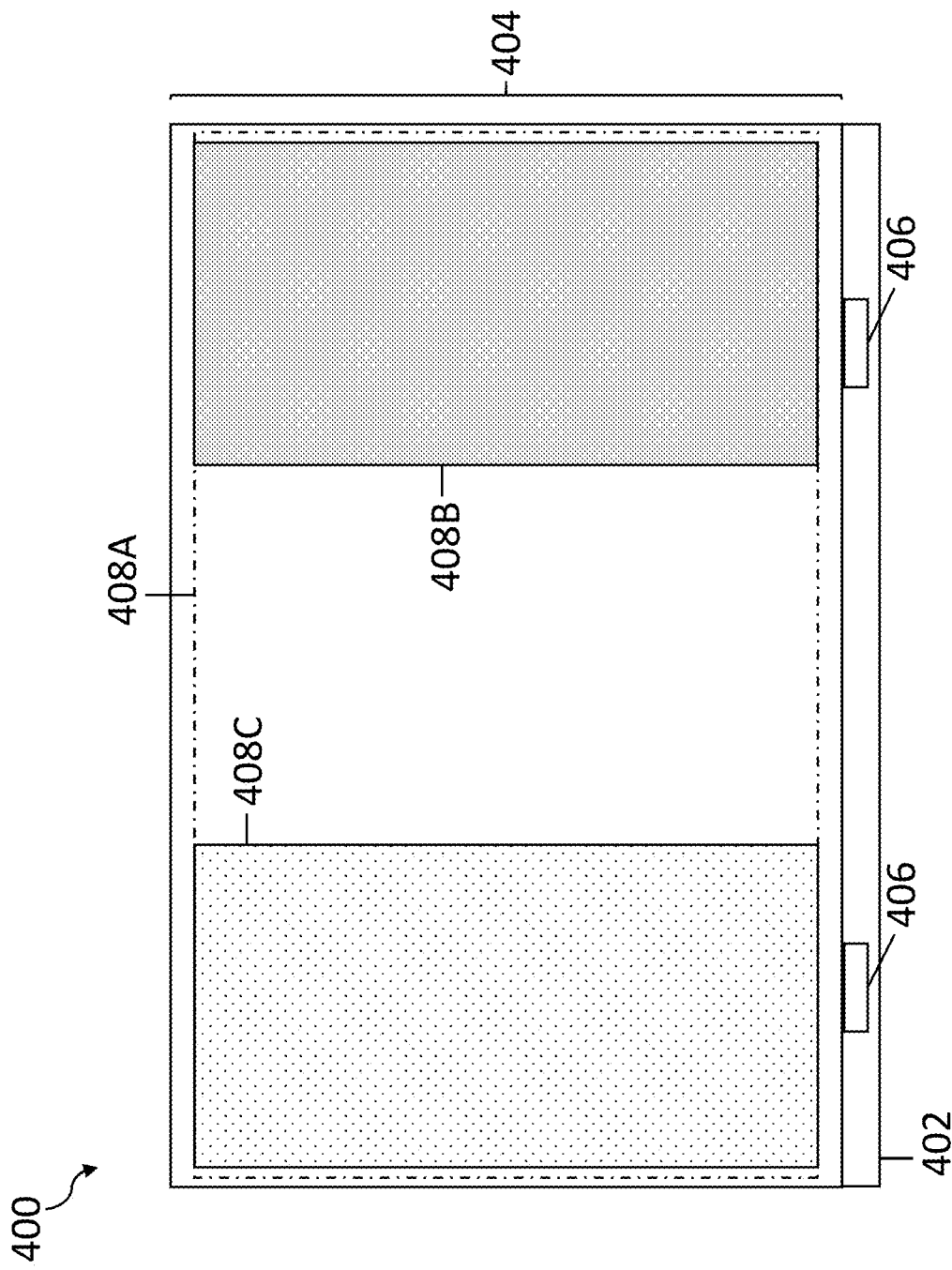
FIG. 4 is a block diagram depicting an electronic device having lid display areas, in accordance with various examples.

Referring now to FIG. 4, a block diagram showing an electronic device 400 having lid display areas is shown, in accordance with various examples. The electronic device 400 is the electronic device 100, 200, 300, for example. The electronic device 400 includes a base section 402, a lid section 404, and a hinge section 406. The base section 402 is the base section 102, 202, 302, for example. The lid section 404 is the lid section 104, 204, 304, for example. The hinge section 406 is the hinge section 106, 206, 306, for example. The lid section 404 includes display areas 408A, 408B, 408C. In various examples, the display areas 408A, 408B, 408C are referred to as lid display areas. A display area 408A is the display area 118, 208A, 308A, for example. A display area 408B is the display area 120, 208B, for example. A display area 408C is another exterior fixed display area, for example.

In various examples, the base section 402 is coupled to the lid section 404 via the hinge section 406. In some examples, a portion of a display panel (e.g., the display panel 122) that is viewable via the display area 408B is coupled to a first extendable portion (e.g., the extendable portion 123) of a frame of the lid section 404. Another portion of the display panel that is viewable via the display area 408C is coupled to a second extendable portion (e.g., the extendable portion 113) of the frame of the lid section 404. In various examples, the display areas 408B, 408C and the hinge section 406 are disposed on a first side of the electronic device 400. The dotted lines indicate that the display area 408A is disposed on a second side that is an opposite side of the electronic device 400 to the first side.

The electronic device 400 includes the lid section 404 including a first display area, the display area 408B, and a second display area, the display area 408C, and the display panel disposed within the lid section 404, in some examples. The display panel includes a first portion viewable via the first display area according to a first setting, as indicated by the white-dotted gray background, and a second portion viewable via the second display area according to a second setting, as indicated by the black-dotted white background. In various examples, the first setting is different from the second setting. For example, the display area 408B has a first color format, and the display area 408C has a second color format. The color format, as used herein, adjusts a color of the display area, an intensity of the display area, a contrast of the display area, a sharpness of the display area, or a combination thereof. In some examples, the third display area, the display area 408A, is disposed on a side opposite to the display areas 408B, 408C.

Disposing the display area 408A on a first side and the display areas 408B, 408C on a second side enables a first user to interact with the display area 408A while a second user interacts with the display areas 408B, 408C. For example, the first user may utilize a first executable code while the second user views a video via the display area 408B while the display area 408C is for displaying notifications to the second user.

Figure 5:
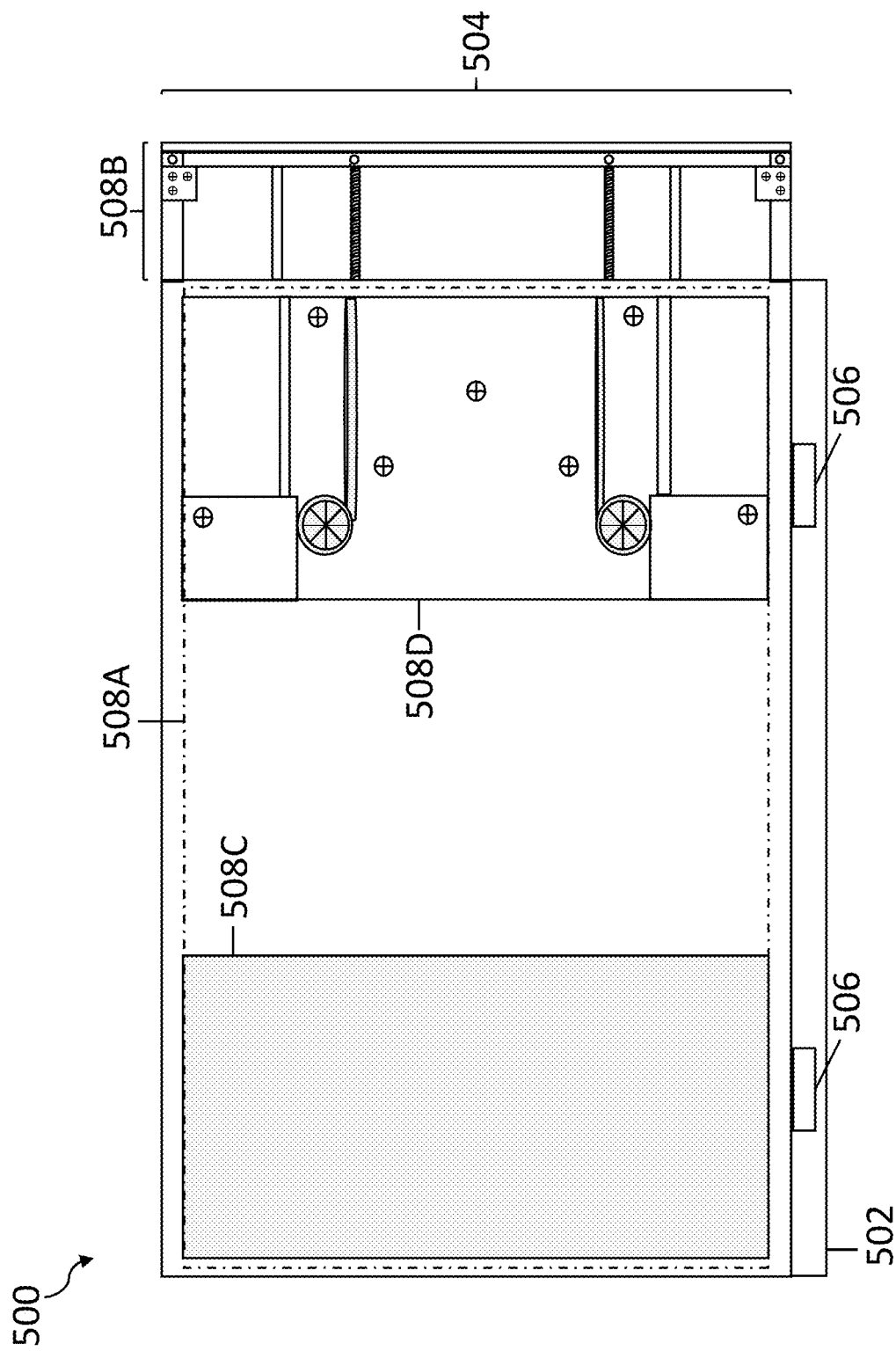
FIG. 5 is a block diagram depicting an electronic device having lid display areas, in accordance with various examples.

Referring now to FIG. 5, a block diagram showing an electronic device 500 having lid display areas is shown, in accordance with various examples. The electronic device 500 is the electronic device 100, 200, 300, 400, for example. The electronic device 500 includes a base section 502, a lid section 504, and a hinge section 506. The base section 502 is the base section 102, 202, 302, 402, for example. The lid section 504 is the lid section 104, 204, 304, 404, for example. The hinge section 506 is the hinge section 106, 206, 306, 406, for example. The lid section 504 includes display areas 508A, 508B, 508C, 508D. In various examples, the display areas 508A, 508B, 508C, 508D are referred to as lid display areas. A display area 508A is the display area 118, 208A, 308A, 408A, for example. A display area 508B is the display area 308B, for example. A display area 508C is the display area 408C, for example. A display area 508D is the display area 120, 208B, 408B, for example. The display area 508A is a fixed, interior display area, the display area 508B is an extendable display area, and the display areas 508C, 508D are fixed, exterior display areas.

The electronic device 500 includes mechanisms for facilitating the extension and retraction of an extendable portion of the frame of the lid section 504. The mechanisms include pins, hooks, movable rollers, belts, springs, gear assemblies, a motor, rack and pinion drives, linear actuators, electronic circuitry, or a combination thereof. The mechanisms are visible on a backside of the display area 508B and via a transparent cover of the display area 508D, for example.

In various examples, the base section 502 is coupled to the lid section 504 via the hinge section 506. The display area 508B is coupled to a first extendable portion of the frame of the lid section 504. A first portion of a display panel (e.g., the display panel 122) is coupled to the first extendable portion of the frame of the lid section 504. The first extendable portion of the frame is the extendable portion 123, for example. In some examples, a second portion of the display panel is coupled to a second extendable portion (not explicitly shown) of the frame. The second extendable portion of the frame is the extendable portion 113, for example. In response to the second extendable portion of the frame having a non-extended state, the second portion of the display panel is viewable via the display area 508C, for example.

In some examples, the hinge section 506 and the display areas 508C, 508D are disposed on a first side of the electronic device 500. The dotted lines indicate that the display area 508A is disposed on a second side that is an opposite side of the electronic device 500 to the first side. The display area 508B is disposed on the second side that is the opposite side of the electronic device 500 to the first side.

While in the example shown, when the extendable portion of the frame is extended, the mechanisms are viewable via the display area 508D, in other examples, the display area 508C, 508D includes a tinted glass that blocks viewing of the mechanisms when a power setting of the display area 508C, 508D is set to indicate that the display area 508C, 508D is in a disabled state. For example, the display area 508C includes the tinted glass, and the gray background indicates that the power setting of the display area 508C indicates the display area 508C is in the disabled state. In various examples, a controller (e.g., the controller 108) adjusts the power setting to indicate the disabled state in response to the extension of the extendable portion of the frame having the portion of the display panel that is viewable via the display area 508C, 508D, respectively.

In various examples, the electronic device 500 includes the lid section 504 including a first display area, the display area 508A, disposed on an interior side, a second display area, the display area 508D, disposed on an exterior side opposite to the interior side, and an extendable portion of a frame. A display panel is disposed within the lid section 504. For example, a backside of the display panel is shown coupled to the mechanisms for rolling the display panel. The display panel includes a first portion coupled to the extendable portion of the frame and a second portion viewable via the first display area. In response to the extendable portion of the frame having a first orientation, the first portion is viewable via an extendable display area coupled to the extendable portion of the frame. For example, when the extendable portion of the frame is extended, the first portion is viewable via the display area 508B. In response to the extendable portion of the frame having a second orientation, the first portion is viewable via the second display area. For example, when the extendable portion of the frame is retracted, the first portion is viewable via the display area 508D.

In some examples, the extendable portion of the frame is a first extendable portion of the frame and the extendable display area (e.g., the display area 508B) is a first extendable display area. The lid section 504 includes a third display area, the display area 508C, disposed on the exterior side and a second extendable portion (not explicitly shown) of the frame opposite to the first extendable portion of the frame. The display panel includes a third portion coupled to the second extendable portion of the frame. In response to the second extendable portion having a third orientation, the third portion is viewable via a second extendable display area (not explicitly shown) coupled to the second extendable portion of the frame. For example, when the second extendable portion is extended, the third portion is viewable via a display area not explicitly shown. In response to the second extendable portion having a fourth orientation, the third portion is viewable via the third display area. For example, when the second extendable portion is retracted into the frame of the lid section 504, the third portion is viewable via the display area 508C.

In various examples, in response to the first extendable portion of the frame having the first orientation, the first portion is viewable via the first extendable display area according to a first setting. For example, the first setting indicates a first language. In response to the first extendable portion of the frame having the second orientation, the first portion is viewable via the second display area according to a second setting. For example, the second setting indicates a second language. In response to the second extendable portion of the frame having the third orientation, the third portion is visible via the second extendable display area according to a third setting. For example, the third setting indicates a third language. In response to the second extendable portion of the frame having the fourth orientation, the third portion is visible via the third display area according to the second setting.

Utilizing the lid section 504 that includes the extendable display area, the display area 508B, and the multiple fixed display areas, the display areas 508A, 508C, 508D, increases dimensions of an overall display area of the electronic device 500. By including the exterior fixed display area, the display areas 508C, 508D, and the interior fixed display area, the display area 508A, data is viewable whether the lid section 504 of the electronic device 500 is opened or closed. By having adjustable power settings of the display areas 508A, 508B, 508C, 508D, the electronic device 500 reduces battery consumption by enabling unused lid display areas to be switched off, or disabled.

Figure 6:
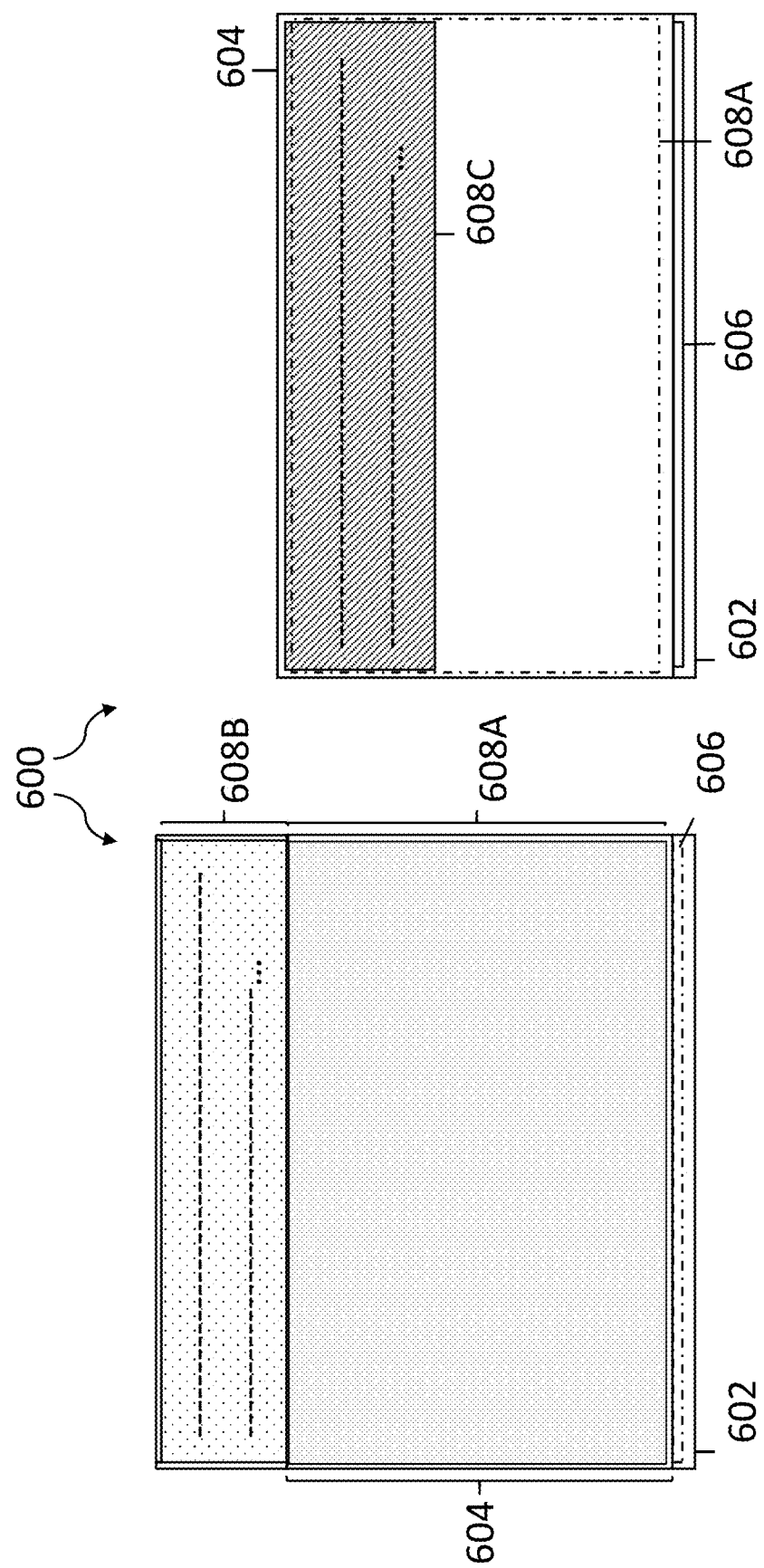
FIGS. 6A and 6B are block diagrams depicting an electronic device having lid display areas, in accordance with various examples.

Referring now to FIGS. 6A and 6B, block diagrams showing different views of an electronic device 600 having lid display areas are shown, in accordance with various examples. The electronic device 600 is the electronic device 100, 200, 300, 400, 500, for example. The electronic device 600 includes a base section 602, a lid section 604, and a hinge section 606. The base section 602 is the base section 102, 202, 302, 402, 502, for example. The lid section 604 is the lid section 104, 204, 304, 404, 504, for example. The hinge section 606 is the hinge section 106, 206, 306, 406, 506, for example. In various examples, the base section 602 is coupled to the lid section 604 via the hinge section 606.

Referring now to FIG. 6A, a block diagram of a first side of the electronic device 600 having lid display areas in a first configuration is shown. The dotted lines indicate that the hinge section 606 is disposed on an opposite side of the first side. The first side of the lid section 604 includes display areas 608A, 608B. In various examples, the display areas 608A, 608B are referred to as lid display areas. The lid section 604 is in the opened position and an extendable portion of a frame of the lid section 604 is extended. A first portion of a display panel (e.g., the display panel 122) is viewable via a display area 608A. The display area 608A is the display area 118, 208A, 308A, 408A, 508A, for example. A second portion of the display panel is viewable via a display area 608B. The display area 608B is an extendable display area, for example. In various examples, the display area 608A has a first setting and the display area 608B has a second setting, where the first setting, as indicated by the gray background, is different than the second setting, as indicated by the black-dotted white background. In some examples, the display area 608A display contents of a first executable code, as indicated by the gray background, and the display area 608B displays contents of a second executable code, such as an electronic book reading application, as indicated by the black-dotted white background.

Referring now to FIG. 6B, a block diagram of a second side of the electronic device 600 having lid display areas in a second configuration is shown. The dotted lines indicate that the display area 608A is disposed on an opposite side to the second side. The second side of the lid section 604 includes display area 608C. In various examples, the display area 608C is referred to as a lid display area. The lid section 604 is in the opened position and the extendable display area is retracted into the lid section 604. The second portion of the display panel is viewable via a display area 608C.

Referring now to FIGS. 6A and 6B, in various examples, the second portion of the display panel displays contents of an executable code, such as an electronic book reading application. When viewable via the display area 608B, the contents are viewed according to a first setting. When viewable via the display area 608C, the contents are viewed according to a second setting. The first setting, as indicated by the black-dotted white background of the display area 608B, is different than the second setting, as indicated by the black diagonally lined gray background of the display area 608C.

In other examples, the electronic device 600 includes the lid section 604 including a first display area, the display area 608A, disposed on an interior side, a second display area, the display area 608C, disposed on an exterior side opposite to the interior side, and an extendable portion of a frame, and a display panel disposed within the lid section 604. The display panel includes a first portion coupled to the extendable portion of the frame and a second portion viewable via the first display area. In response to the extendable portion of the frame having a first orientation, the first portion is viewable via an extendable display area, the display area 608B, coupled to the extendable frame, as shown in FIG. 6A, and, in response to the extendable portion of the frame having a second orientation, the first portion is viewable via the second display area, as shown in FIG. 6B. In some examples, as described above with respect to FIG. 5, the first display area and the second display area include a power setting. In various examples, the power setting for each display area is separately adjustable.

In some examples, in response to the extendable portion of the frame having the first orientation, the first portion is viewable via the extendable display area according to a first setting, as indicated by the black-dotted white background of the display area 608B, and wherein, in response to the extendable portion of the frame having the second orientation, the first portion is viewable via the second display area according to a second setting, as indicated by the black diagonally lined gray background of the display area 608C.

Figure 7:
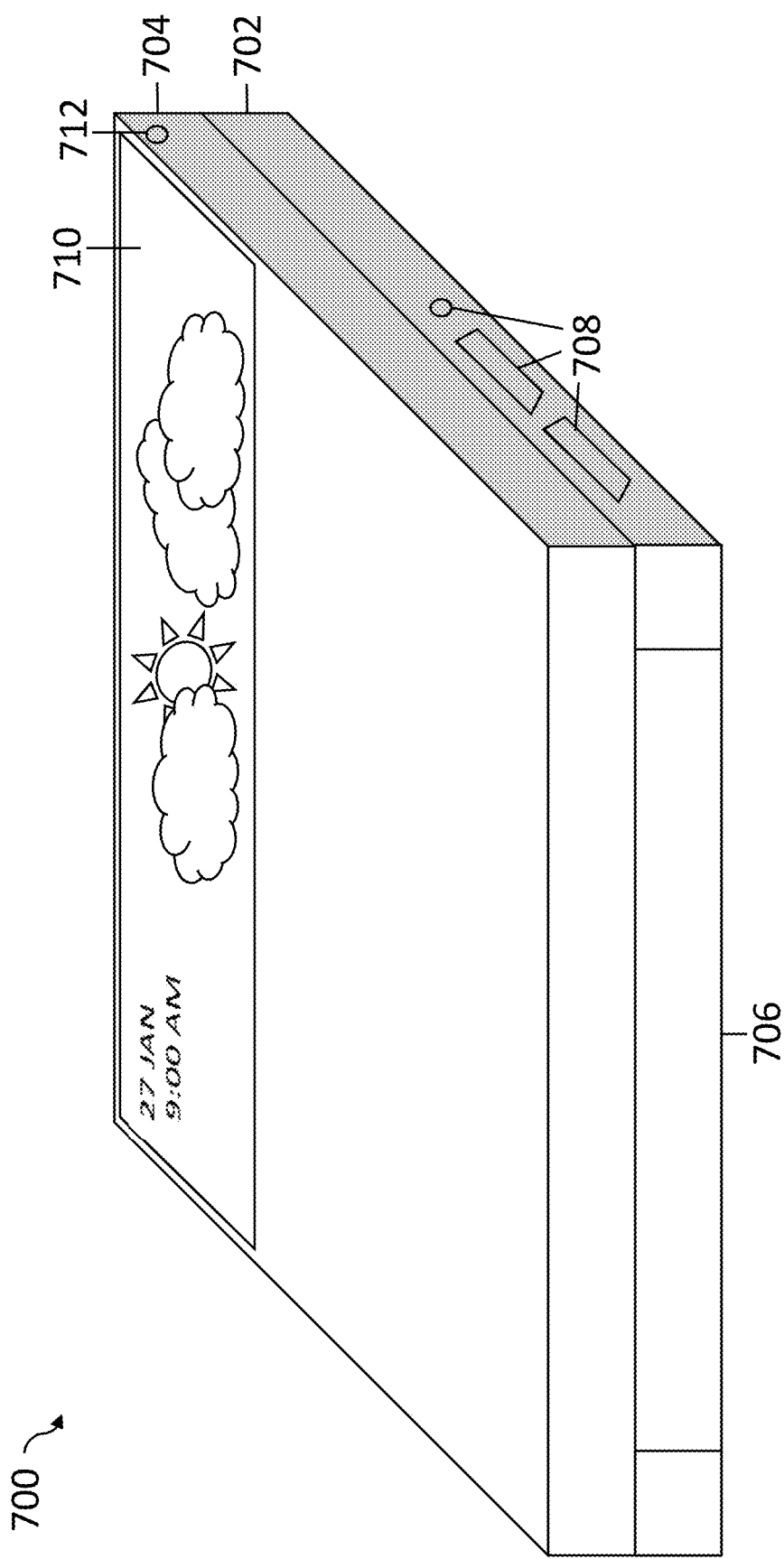
FIG. 7 is a block diagram depicting an electronic device having lid display areas, in accordance with various examples.

Referring now to FIG. 7, a block diagram showing an electronic device 700 having a lid display area is shown, in accordance with various examples. The electronic device 700 is the electronic device 100, 200, 300, 400, 500, 600, for example. The electronic device 700 includes a base section 702, a lid section 704, and a hinge section 706. The base section 702 includes ports 708. The ports 708 are connectors that enable additional I/O devices to couple to the electronic device 700. The ports 708 include a universal serial bus (USB) connector, an audio device connector, a display device connector, or a combination thereof, for example. The lid section 704 includes a display area 710 and an input device 712. In various examples, the display area 710 is referred to as a lid display area. The input device 712 enables a user to interact with the display area 710. In various examples, the base section 702 is coupled to the lid section 704 via the hinge section 706.

In some examples, the input device 712 enables the user to cause the extension of an extendable portion (not explicitly shown) of the frame of the lid section 704. The input device 712 is a button, a knob, or other physical device that enables the user to cause the extendable portion to open by a specified amount, for example. In other examples, the input device 712 enables the user to switch the power setting for the display area 710 between a first state and a second state.

In various examples, the electronic device 700 includes multiple input devices that enable the user to interact with the display area 710. For example, a first button enables the user to switch the power setting for the display area 710 between the first state and the second state, and a second button enables the user to switch between on-screen options displayed in the display area 710. Other buttons of the multiple input devices control different settings for the display area 710, in some examples.

In various examples, when the extendable portion of the frame is retracted into the lid section 704, regardless of the whether the electronic device 700 is opened or closed, a portion of a display panel (e.g., the display panel 122) is viewable via the display area 710. For example, the portion of the display panel displays a notification. The notification includes a system notification (e.g., update available), an application notification (e.g., a message received), or a combination thereof. For example, the portion of the display panel displays a notification that indicates a weather condition, a date, and a time. In another example, the portion of the display panel displays a static image. The static image is a decorative image, for example.

Figure 8:
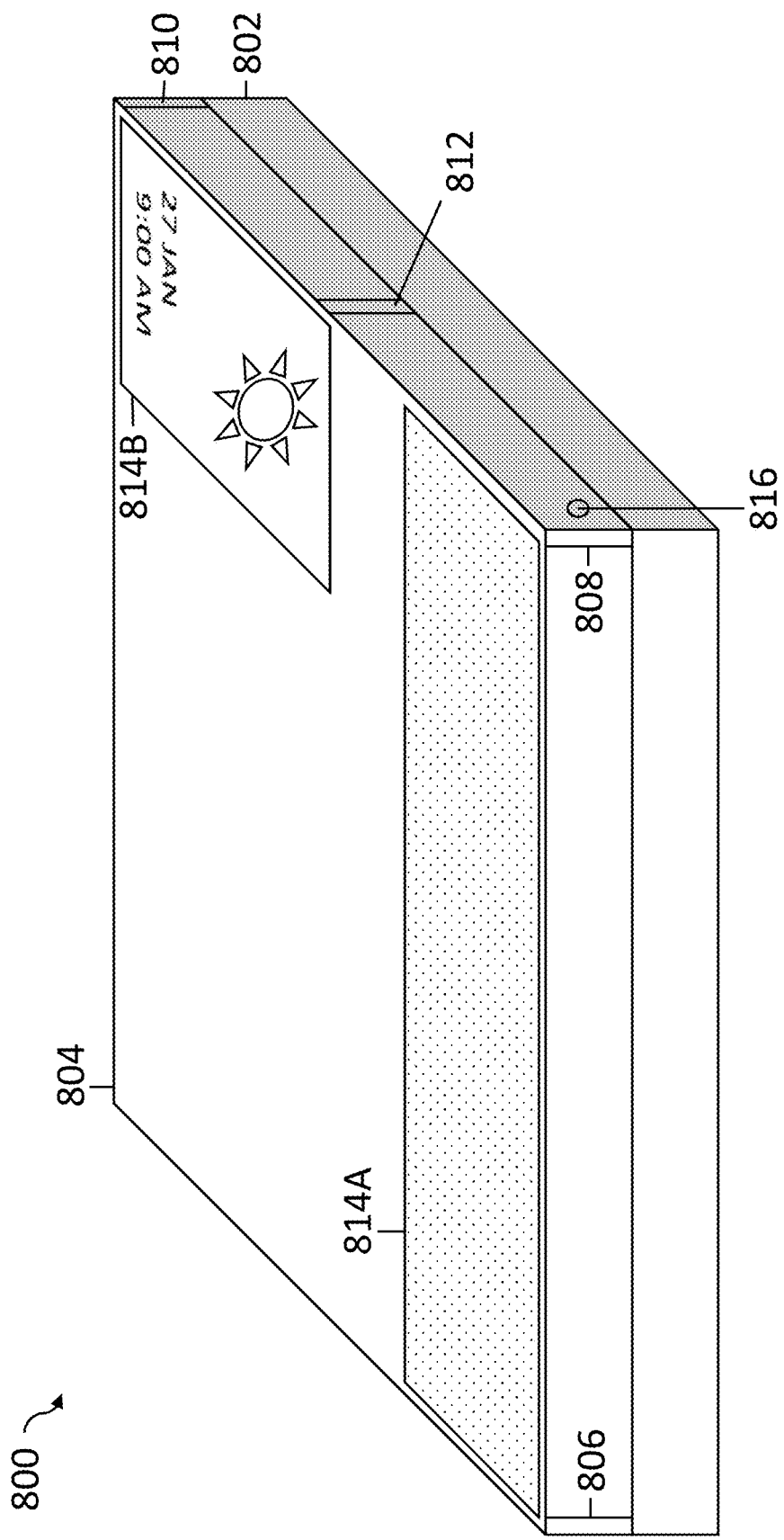
FIG. 8 is a block diagram depicting an electronic device having lid display areas, in accordance with various examples.

Referring now to FIG. 8, a block diagram depicting an electronic device 800 having lid display areas is shown, in accordance with various examples. The electronic device 800 is the electronic device 100, 200, 300, 400, 500, 600, 700, for example. The electronic device 800 includes a base section 802 and a lid section 804. The lid section 804 includes edges 806, 808 of an extendable portion of a frame, edges 810, 812 of another extendable portion of the frame, display areas 814A, 814B, and an input device 816. In various examples, the display areas 814A, 814B are referred to as a lid display area. The input device 816 is the input device 712, for example.

In various examples, the base section 802 is coupled to the lid section 804 via the hinge section (not explicitly shown). In some examples, the edges 806, 808 are edges of a first extendable portion of the frame of the lid section 804, and the edges 810, 812 are edges of a second extendable portion of the frame of the lid section 804. The first extendable portion is disposed on a first side of the frame of the lid section 804. The second extendable portion of the frame is disposed on a second side of the frame. The second side is coupled to the first side at a corner. A first portion of a display panel couples to the first extendable portion of the frame and a second portion of the display panel couples to the second extendable portion of the frame. When retracted, the first portion of the display panel is viewable via a display area 814A. When retracted, the second portion of the display panel is viewable via a display area 814B. In some examples, a setting of the display area 814A, as shown by the black-dotted white background, is different than a setting of the display area 814B, as shown by the white background of the weather, date, and time notification.

While in some examples, the input device 816 enables a user to switch the power setting for the display area 814A, 814B from a first state to a second state, in other examples, the electronic device 800 includes a sensor (not explicitly shown) that detects motion. The sensor is an accelerometer, a gyroscope, an image sensor (e.g., a time of flight (ToF) sensor, an infrared (IR) sensor, a light detection and ranging (LiDAR) sensor), or any suitable sensor for detecting motion. In response to the sensor detecting motion, a controller (e.g., the controller 108) enables the display area 814A, the display area 814B, or a combination thereof. For example, in response to the sensor detecting cessation of a motion of the electronic device 800 (e.g., the electronic device 800 is placed on a stable surface), the controller enables the display area 814B.

While in the examples above, a base section (e.g., the base section 102, 202, 302, 402, 502, 602, 702, 802) is coupled to a lid section (e.g., the lid section 104, 204, 304, 404, 504, 604, 704, 804) via a hinge section (e.g., the hinge section 106, 206, 306, 406, 506, 606, 706), in other examples, the base section is coupled to the lid section via a wired connection (e.g., USB, Video Graphics Array (VGA), Digital Visual Interface (DVI), High-Definition Multimedia Interface (HDMI), DisplayPort (DP), Serial Digital Interface (SDI), Network Device Interface (NDI)) or a wireless connection (e.g., WI-FI®, BLUETOOTH®). The interior fixed display area is disposed in a first direction. The exterior fixed display area is disposed in a second direction that is opposite to the first direction. For example, the interior fixed display area is disposed in a direction that is viewable by a user utilizing I/O devices disposed within a frame of the base section, and the exterior fixed display area is disposed in an opposite direction that is not viewable by the user utilizing the I/O devices of the base section. In some examples, the exterior fixed display area is disposed in a direction that is viewable by a user utilizing I/O devices wirelessly coupled to the base section, and the interior fixed display area is disposed in the opposite direction that is not viewable by the user utilizing the I/O devices wirelessly coupled to the base section.

Utilizing a lid section (e.g., the lid section 104, 204, 304, 404, 504, 604, 704, 804) that includes an extendable display area (e.g., the display area 308B, 308C, 508B, 608B) and multiple fixed display areas (e.g., the display areas 118, 120;

the display areas 208A, 208B, the display area 308A; the display area 408A, 408B, 408C; the display area 508A, 508C, 508D; the display area 608A; the display area 710; the display areas 814A, 814B) increases dimensions of an overall display area of an electronic device (e.g., the electronic device 100, 200, 300, 400, 500, 600, 700, 800). By including the exterior fixed display area (e.g., the display area 120, 208B, 408B, 408C, 508C, 508D, 608C, 710, 814A, 814B) and the interior fixed display area (e.g., the display area 118, 208A, 308A, 408A, 508A, 608A), data is viewable whether the lid section of the electronic device is opened or closed. By utilizing the exterior fixed display area and an input device (e.g., the input device 712, 816), a user is able to interact with the electronic device via the exterior fixed display area without opening the lid section, thereby enhancing the user experience. The electronic device including the exterior fixed display area, the extendable display area, or the combination thereof, having different settings enables the user to utilize the various display areas for different purposes. The electronic device including the exterior fixed display area and the interior fixed display area enables a first user of the electronic device to utilize the electronic device simultaneously with a second user of the electronic device.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component are omitted.

In the above description and in the claims, the terms "including" and "comprising" are used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. A notebook computer, comprising:
   a base section comprising a physical keyboard;
   a hinge section;
   a lid section including a first display area disposed on an interior side, a second display area disposed on an exterior side opposite to the interior side, and a third display area disposed on an extendable portion of a frame, wherein the interior side is disposed on a top side of the base section when the lid section is closed, and wherein the base section is mechanically coupled to the lid section via the hinge section; and
   a display panel disposed within the lid section, the display panel including a first portion and a second portion, the first portion visible via the first display area and the second portion visible via the second display area,
   wherein the extendable portion of the frame is configured to transition between a first position within an interior volume of the lid section and a second position external to the lid section.

2. The notebook computer of claim 1, wherein the display panel is a rollable display panel.

3. The notebook computer of claim 1, wherein the second portion is visible via the third display area.

4. The notebook computer of claim 3, wherein the first portion is visible via the first display area according to a first setting and the second portion is visible via the second display area according to a second setting, and wherein the first setting is different than the second setting.

5. The notebook computer of claim 4, wherein, in response to the extension of the extendable portion of the frame, the second portion is visible via the third display area according to a third setting, and wherein the third setting is different than the first setting and the second setting.

6. A notebook computer, comprising:
   a base section comprising a physical keyboard;
   a hinge section;
   a lid section including a first display area and a second display area, wherein the base section is mechanically coupled to the lid section via the hinge section; and
   a display panel disposed within the lid section, the display panel including a first portion viewable via the first display area according to a first setting and a second portion viewable via the second display area according to a second setting,
   wherein the first setting is different from the second setting,
   wherein the second display area is on an extendable portion of a frame, and
   wherein a transition mechanism is configured to translate the extendable portion of the frame between a first position within an interior volume of the lid section and a second position external to the lid section.

7. The notebook computer of claim 6, wherein the first display area is on a first side of the lid section and the second display area is on a second side of the lid section, and wherein the first side is opposite the second side.

8. The notebook computer of claim 6, wherein the lid section includes a third display area.

9. The notebook computer of claim 8, wherein the display panel includes a third portion viewable via the third display area according to a third setting.

10. An electronic device, comprising:
    a lid section including a first display area disposed on an interior side, a second display area disposed on an exterior side opposite to the interior side, and an extendable portion of a frame, wherein the lid section comprises an interior volume for accommodating the extendable portion of the frame;
    a sliding mechanism coupled to the lid section and the extendable portion of the frame, the sliding mechanism to translate the extendable portion of the frame between an extended position and the interior volume;
    a display panel disposed within the lid section, the display panel including a first portion coupled to the extendable portion of the frame and a second portion viewable via the first display area,
    wherein, in response to the extendable portion of the frame having a first orientation, the first portion is viewable via an extendable display area coupled to the extendable portion of the frame, the extendable display area viewable from the interior side of the lid section; and
    wherein, in response to the extendable portion of the frame having a second orientation, the first portion is viewable via the second display area.

11. The electronic device of claim 10, wherein, in response to the extendable portion of the frame having the first orientation, the first portion is viewable via the extendable display area according to a first setting, and wherein, in response to the extendable portion of the frame having the second orientation, the first portion is viewable via the second display area according to a second setting.

12. The electronic device of claim 10, wherein the first display area and the second display area include a power setting.

13. The electronic device of claim 10, wherein the extendable portion of the frame is a first extendable portion of the frame and the extendable display area is a first extendable display area, wherein the lid section includes a third display area disposed on the exterior side and a second extendable portion of the frame opposite to the first extendable portion of the frame, wherein the display panel includes a third portion coupled to the second extendable portion of the frame and wherein, in response to the second extendable portion having a third orientation, the third portion is viewable via a second extendable display area coupled to the second extendable portion of the frame, and wherein, in response to the second extendable portion having a fourth orientation, the third portion is viewable via the third display area.

14. The electronic device of claim 13, wherein, in response to the first extendable portion of the frame having the first orientation, the first portion is viewable via the first extendable display area according to a first setting, wherein, in response to the first extendable portion of the frame having the second orientation, the first portion is viewable via the second display area according to a second setting, wherein, in response to the second extendable portion of the frame having the third orientation, the third portion is visible via the second extendable display area according to a third setting, and wherein, in response to the second extendable portion of the frame having the fourth orientation, the third portion is visible via the third display area according to the second setting.

15. The notebook computer of claim 1, wherein the transition mechanism comprises pins, hooks, movable rollers, belts, springs, gear assemblies, a motor, rack and pinion drives, linear actuators, electronic circuitry, or a combination thereof.

16. The notebook computer of claim 6, wherein the transition mechanism comprises pins, hooks, movable rollers, belts, springs, gear assemblies, a motor, rack and pinion drives, linear actuators, electronic circuitry, or a combination thereof.

* * * * *